United States Patent
Omara et al.

(10) Patent No.: US 8,924,984 B2
(45) Date of Patent: Dec. 30, 2014

(54) LOCK-FREE BARRIER WITH DYNAMIC UPDATING OF PARTICIPANT COUNT

(75) Inventors: Emad Omara, Bellevue, WA (US); John Duffy, Renton, WA (US)

(73) Assignee: Microsoft Corporation, Redmond, WA (US)

(*) Notice: Subject to any disclaimer, the term of this patent is extended or adjusted under 35 U.S.C. 154(b) by 884 days.

(21) Appl. No.: 12/492,366

(22) Filed: Jun. 26, 2009

(65) Prior Publication Data
US 2010/0333107 A1    Dec. 30, 2010

(51) Int. Cl.
G06F 9/46 (2006.01)
G06F 9/52 (2006.01)

(52) U.S. Cl.
CPC .............. *G06F 9/522* (2013.01); *G06F 9/526* (2013.01); *G06F 9/524* (2013.01)
USPC ........... 718/106; 718/100; 718/102; 718/105; 718/107; 711/153; 711/707

(58) Field of Classification Search
CPC .......... G06F 9/522; G06F 9/524; G06F 9/526
USPC .................. 718/100, 102, 106, 107; 711/153; 707/E17.005
See application file for complete search history.

(56) References Cited

U.S. PATENT DOCUMENTS

| | | | |
|---|---|---|---|
| 6,360,220 B1 | 3/2002 | Forin | |
| 7,016,923 B2* | 3/2006 | Garthwaite et al. | 1/1 |
| 7,047,337 B2* | 5/2006 | Armstrong et al. | 710/200 |
| 7,058,945 B2* | 6/2006 | Ichinose et al. | 718/102 |
| 7,299,242 B2* | 11/2007 | Moir et al. | 1/1 |
| 7,451,146 B2 | 11/2008 | Boehm | |
| 7,487,501 B2* | 2/2009 | Silvera et al. | 718/100 |
| 7,581,222 B2* | 8/2009 | Blainey et al. | 718/102 |
| 7,610,585 B2* | 10/2009 | Shpeisman et al. | 718/102 |
| 7,770,170 B2* | 8/2010 | Rector et al. | 718/102 |
| 7,814,486 B2* | 10/2010 | Papakipos et al. | 718/100 |
| 7,945,911 B1* | 5/2011 | Garthwaite | 718/102 |
| 2005/0050374 A1* | 3/2005 | Nakamura et al. | 713/375 |
| 2007/0169123 A1* | 7/2007 | Hopkins | 718/100 |
| 2008/0077775 A1 | 3/2008 | Shavit et al. | |
| 2008/0209433 A1 | 8/2008 | McKenney | |
| 2008/0216076 A1* | 9/2008 | Udell et al. | 718/100 |
| 2010/0185703 A1* | 7/2010 | Ylonen | 707/816 |
| 2010/0250809 A1* | 9/2010 | Ramesh et al. | 710/200 |

OTHER PUBLICATIONS

Michael, Maged M., "Scalable Lock-Free Dynamic Memory Allocation", "PLDI'04", Jun. 9-11, 2004, pp. 12.

(Continued)

*Primary Examiner* — Meng An
*Assistant Examiner* — Abu Ghaffari (57) ABSTRACT

A method of executing an algorithm in a parallel manner using a plurality of concurrent threads includes generating a lock-free barrier that includes a variable that stores both a total participants count and a current participants count. The total participants count indicates a total number of threads in the plurality of concurrent threads that are participating in a current phase of the algorithm, and the current participants count indicates a total number of threads in the plurality of concurrent threads that have completed the current phase. The barrier blocks the threads that have completed the current phase. The total participants count is dynamically updated during execution of the current phase of the algorithm. The generating, blocking, and dynamically updating are performed by at least one processor.

17 Claims, 8 Drawing Sheets

(56) References Cited

OTHER PUBLICATIONS

Dechev, et al., "Lock-free Dynamically Resizable Arrays", retrieved at .research.att.com/~bs/lock-free vector.pdf>>, pp. 12.

Michael, Maged M., "Hazard Pointers: Safe Memory Reclamation for Lock-Free Objects", "IEEE Transactions on Parallel and Distributed Systems, Vol. 15, No. 6", Jun. 2004, pp. 491-504.

Alexandrescu, Andrei., "Lock-Free Data Structures", retrieved at erdani.org/publications/cuj-2004-10.pdf>>, Dec. 17, 2007, pp. 1-7.

Duffy, J., "Concurrent Programming on Windows", © 2009; pp. 650-655.

Managed World blog avaialble at ://geekswithblogs.net/jolson/Defaultaspx >>; published Oct. 23, 2009; 9 Pages.

Microsoft Corp., article entitled "ManualResetEvent Class"; available at <<http://msdn.microsoft.com/en-us/library/system.threading.manualresetevent.aspx >>; © 2009; 7 Pages.

MSDN.Com blog entitled "Parallel Programming with .NET—Coordination Data Structures Overview"; avaiable at /blogs.msdn.com/pfxteam/archive/2008/06/18/8620615.aspx; © 2009; 7 pgs.

* cited by examiner

LOCK-FREE BARRIER WITH DYNAMIC UPDATING OF PARTICIPANT COUNT

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that, for example, the same logical operation can utilize many processors at one time to thereby deliver better performance as more processors are added to the computers on which such software runs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A barrier is a type that blocks all threads that have reached the end of a phase until a specified number of threads have reached the end of the phase, and then atomically releases these blocked threads. A barrier can be used to help multiple concurrent threads cooperatively work on an algorithm in parallel.

One embodiment provides a method of executing an algorithm in a parallel manner using a plurality of concurrent threads. A lock-free barrier is generated that includes a variable that stores both a total participants count and a current participants count. The total participants count indicates a total number of the threads that are participating in a current phase of the algorithm, and the current participants count indicates a total number of the threads that have completed the current phase. The barrier blocks the threads that have completed the current phase. The total participants count is dynamically updated during execution of the current phase of the algorithm.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides a lock-free barrier application with dynamic updating of participant counts, but the technologies and techniques described herein also serve other purposes in addition to these. In one implementation, one or more of the techniques described herein can be implemented as features within a framework program such as Microsoft®.NET Framework, or within any other type of program or service.

A barrier can be used to help multiple participants (e.g., threads) cooperatively work on an algorithm in parallel. Computations that use barriers are typically called phased computations. Algorithms that use barriers are typically divided into separate phases, which are sometimes cyclic, and each participating thread waits for all of the participating threads to reach the end of the current phase before moving to the next phase. A barrier according to one embodiment is a type that blocks all threads that reach the end of a phase until a specified number of threads have reached the end of the phase, and then atomically releases these threads. A barrier according to one embodiment may be defined as a synchronization primitive that enforces the stopping of execution between a number of threads or processors at a given point and prevents further execution until all threads or processors have reached the given point.

Figure 1:
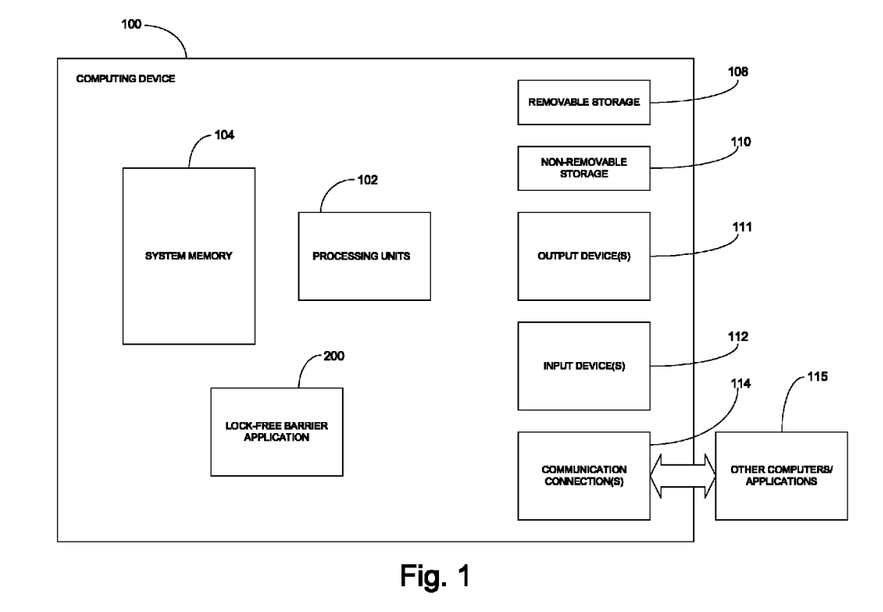
FIG. 1 is a diagram illustrating a computing system suitable for executing a lock-free barrier application according to one embodiment.

FIG. 1 is a diagram illustrating a computing device 100 suitable for executing a lock-free barrier application according to one embodiment. In the illustrated embodiment, the computing system or computing device 100 includes a plurality of processing units 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional non-transitory storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, non-transitory removable and non-removable media implemented in any suitable method or technology for non-transitory storage of information such as computer readable instructions, data structures, program modules or other data. Memory 104, removable storage 108 and non-removable storage 110 are all examples of computer storage media (e.g., non-transitory computer-readable storage media storing computer-executable instructions for performing a method). Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices. Any such non-transitory computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes a lock-free barrier application 200. Lock-free barrier application 200 is described in further detail below with reference to FIG. 2.

Figure 2:
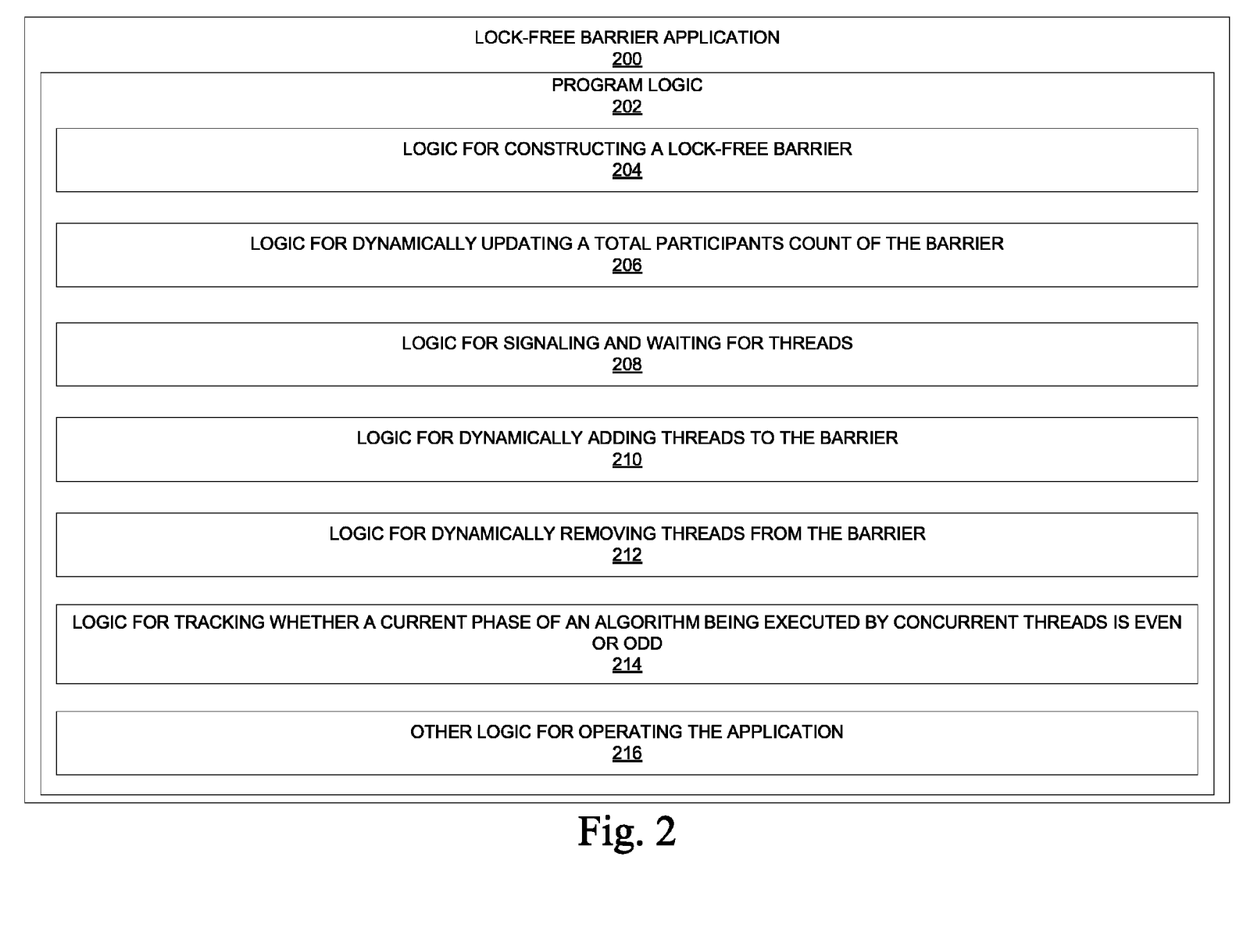
FIG. 2 is a diagrammatic view of a lock-free barrier application for operation on the computer system illustrated in FIG. 1 according to one embodiment.

FIG. 2 is a diagrammatic view of a lock-free barrier application 200 for operation on the computing device 100 illustrated in FIG. 1 according to one embodiment. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Lock-free barrier application 200 includes program logic 202, which is responsible for carrying out some or all of the techniques described herein. Program logic 202 includes logic 204 for constructing a lock-free barrier; logic 206 for dynamically updating a total participants count of the barrier; logic 208 for signaling and waiting for threads; logic 210 for dynamically adding threads to the barrier; logic 212 for dynamically removing threads from the barrier; logic 214 for tracking whether a current phase of an algorithm being executed by concurrent threads is even or odd; and other logic 216 for operating the application.

Turning now to FIGS. 3-8, techniques for implementing one or more embodiments of lock-free barrier application 200 are described in further detail. In some implementations, the techniques illustrated in FIGS. 3-8 are at least partially implemented in the operating logic of computing device 100.

Figure 3:
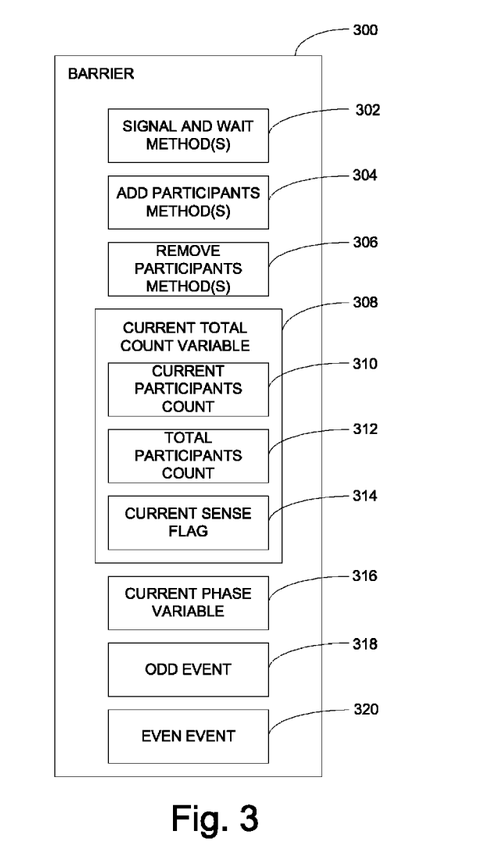
FIG. 3 is a block diagram illustrating a lock-free barrier according to one embodiment.

FIG. 3 is a block diagram illustrating a lock-free barrier 300 according to one embodiment. Barrier 300 includes at least one signal and wait method 302, at least one add participants method 304, at least one remove participants method 306, a current total count variable 308, a current phase variable 316, an odd event synchronization object 318, and an even event synchronization object 320. The current total count variable 308 according to one embodiment is a single 32-bit integer variable that store three sets of information: (1) a current participants count 310 that indicates the number of threads that have finished the current phase; (2) a total participants count 312 that indicates the total number of threads participating in the current phase; and (3) a current sense flag 314 that indicates whether the current phase is odd or even (e.g., a value of true indicates an even phase and a value of false indicates an odd phase, or vice versa). In one embodiment, bits 0-14 of the variable 308 are used to store the total participants count 312 (i.e., so the maximum number of participants for the barrier 300 according to one embodiment is about 32K); bit 15 of the variable 308 is a dummy bit (i.e., is not used); bits 16-30 of the variable 308 are used to store the current participants count 310; and bit 31 of the variable 308 is used to store the current sense flag 314. The barrier 300 according to one embodiment is lock-free because any or all of the three sets of information in the single current total count variable 308 can be updated using a lock-free technique (e.g., a single compare-and-swap (CAS) operation). In the illustrated embodiment, barrier 300 is a sense-reversing barrier that tracks whether the current phase is odd or even using variable 316 and synchronization objects 318 and 320.

The signal and wait method 302 is called by each thread when the thread reaches the end of a phase to indicate its arrival to the other threads. The signal and wait method 302 compares the current participants count 310 and the total participants count 312 (to determine if this is the last remaining thread to arrive), and updates the current participants count 310. The add participants method 304 is called to add one or more threads to the barrier 300 and increase the total participants count 312 accordingly. The remove participants method 306 is called to remove one or more threads from the barrier 300 and decrease the total participants count 312 accordingly. The lock-free barrier 300 according to one embodiment supports dynamic updating of the total participants count 312, so the total participants count 312 can be changed (e.g., increased or decreased) at any given time after the barrier object is created. In one embodiment, the signal and wait method 302, the add participants method 304, and the remove participants method 306 are each configured to update the current total count variable 308 using a single CAS operation (e.g., Interlocked.CompareExchange).

In one embodiment, the current phase variable 316 is a 32-bit integer variable that stores a value representing the current phase. The odd event synchronization object 318 and the even event synchronization object 320 according to one embodiment are each ManualResetEventSlim synchronization objects. A ManualResetEventSlim synchronization object is an event that allows threads to wait on it, and supports event functionalities such as Set, Reset, and Wait. For example, when a thread begins an activity that is to be completed before other threads proceed, the thread calls Reset to put ManualResetEventSlim in a non-signaled state. Threads that call Wait on the ManualResetEventSlim will block and wait for a signal. When a thread calls Set on the ManualResetEventSlim, the blocked threads are signaled and released.

In one embodiment, barrier 300 is implemented with a class that has public application programming interfaces (APIs) as shown in the following Pseudo Code Example I:

PSEUDO CODE EXAMPLE I

```
public class Barrier : IDisposable
{
    /** Constructors **/
    public Barrier(Int32 participantCount);
    public Barrier(Int32 participantCount, Action<Barrier>
        postPhaseAction);
```

-continued

```
/** Methods **/
    public Int32 AddParticipant( );
    public Int32 AddParticipants(Int32 participantCount);
    public void RemoveParticipant( );
    public void RemoveParticipants(Int32 participantCount);
    public void SignalAndWait( );
    public void SignalAndWait(CancellationToken cancellationToken);
    public Boolean SignalAndWait(Int32 millisecondsTimeout);
    public Boolean SignalAndWait(TimeSpan timeout);
    public Boolean SignalAndWait(Int32 millisecondsTimeout,
CancellationToken cancellationToken);
    public void Dispose( );
    protected virtual void Dispose(Boolean disposing);
    /** Properties **/
    public Int32 ParticipantsRemaining { get; }
    public Int32 ParticipantCount { get; }
    public Int32 CurrentPhaseNumber { get; }
  }
}
```

Figure 4:
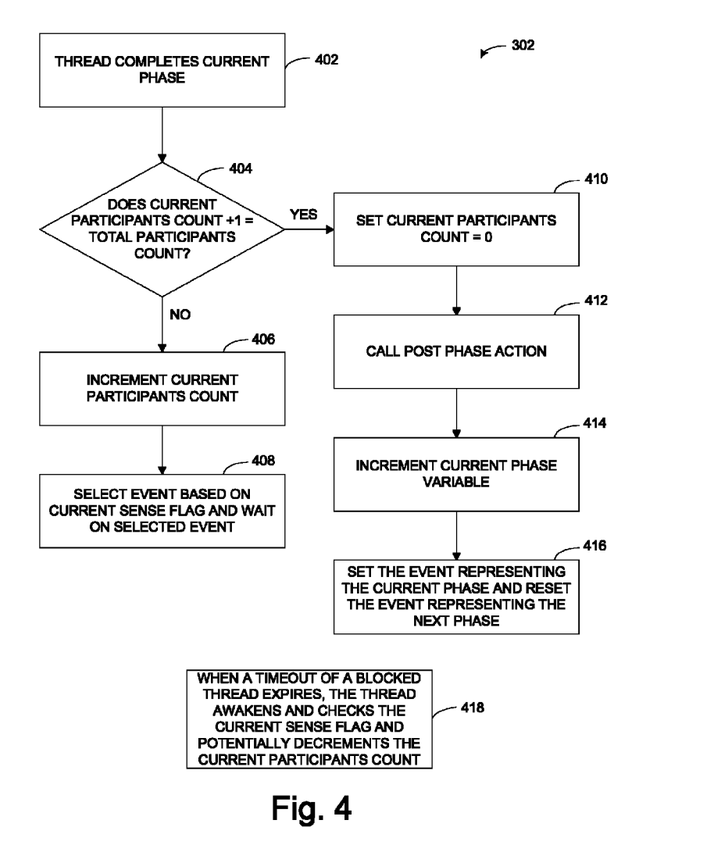
FIG. 4 is a flow diagram illustrating a signal and wait method according to one embodiment.

FIG. 4 is a flow diagram illustrating a signal and wait method 302 according to one embodiment. At 402 in method 302, a thread (i.e., an "arrival" thread) completes the current phase. At 404, the arrival thread determines whether the current participants count 310 plus one is equal to the total participants count 312. If it is determined at 404 that the current participants count 310 plus one does not equal the total participants count 312, which indicates that the arrival thread is not the final thread, the method 302 moves to 406. At 406, the arrival thread increments the current participants count 310 by one. At 408, the arrival thread selects one of the two events 318 or 320 based on the state of the current sense flag 314 and waits on the selected event. For example, if the current sense flag 314 indicates that the current phase is odd, the arrival thread would select the odd event 318 and wait on it at 408, and if the current sense flag 314 indicates that the current phase is even, the arrival thread would select the even event 320 and wait on it at 408.

If it is determined at 404 that the current participants count 310 plus one equals the total participants count 312, which indicates that the arrival thread is the final thread, the method 302 moves to 410. At 410, the arrival thread sets the current participants count 310 to zero and reverses the sense flag 314. At 412, the arrival thread calls a post phase action (e.g., set by the caller in the barrier constructor). At 414, the arrival thread increments the current phase variable 316 by one. At 416, the arrival thread sets the event 318 or 320 representing the current phase, thereby signaling all of the blocked threads, and resets the event 318 or 320 representing the next phase. For example, if the current sense flag 314 indicates that the current phase is odd, the arrival thread would set the odd event 318 and reset the even event 320, and if the current sense flag 314 indicates that the current phase is even, the arrival thread would set the even event 320 and reset the odd event 318.

In one embodiment of method 302, a blocked thread will awaken when the final arrival thread sets the event 318 or 320 representing the current phase at 414 in method 302, or when a timeout expires. As indicated at 418 in method 302, when a timeout of a blocked thread expires, the thread awakens and checks the current sense flag 314 and potentially decrements the current participants count 310. In one embodiment, if the state of the current sense flag 314 does not match the observed state before blocking, this indicates that the current phase has just finished and true is returned, otherwise the current participants count 310 is decremented by one and false is returned.

Figure 5:
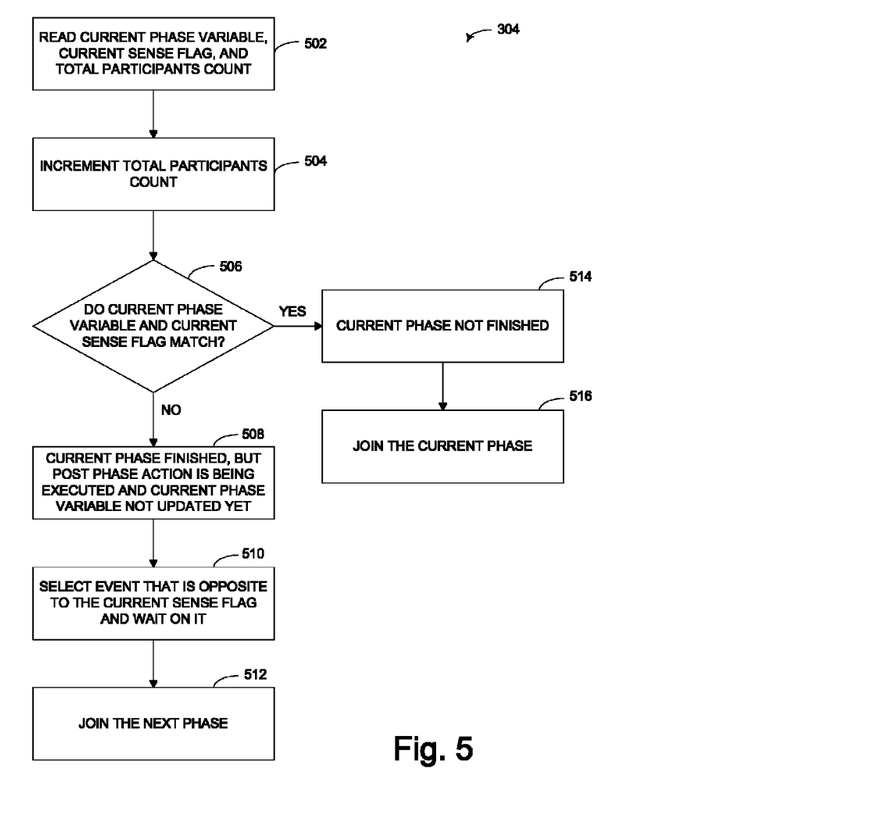
FIG. 5 is a flow diagram illustrating an add participants method according to one embodiment.

FIG. 5 is a flow diagram illustrating an add participants method 304 according to one embodiment. At 502 in method 304, the current phase variable 316, the current sense flag 314, and the total participants count 312 are read. At 504, the total participants count 312 is incremented based on the number of threads being added (e.g., the count 312 is incremented by one if one thread is being added, the count 312 is incremented by two if two threads are being added, etc.). At 506, it is determined whether the current phase variable 316 and the current sense flag 314 match (i.e., are they both even or are they both odd). If it is determined at 506 that the current phase variable 316 and the current sense flag 314 match, the method 304 moves to 514, which indicates that the current phase is not finished, and the threads to be added join the current phase at 516.

If it is determined at 506 that the current phase variable 316 and the current sense flag 314 do not match, the method 304 moves to 508, which indicates that the current phase is finished, but post phase action is being executed and the current phase variable 316 has not been updated yet. At 510, the event 318 or 320 for the current phase is selected, which is opposite to the current sense flag 314, and the threads to be added wait on it. At 512, the current phase is completely finished, and the threads to be added join the next phase.

Figure 6:
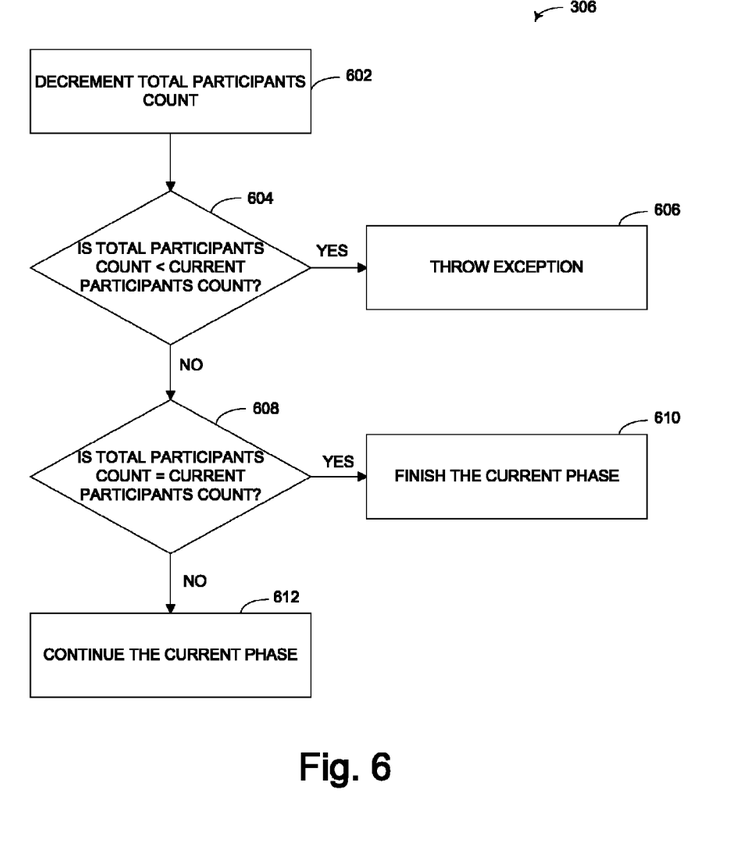
FIG. 6 is a flow diagram illustrating a remove participants method according to one embodiment.

FIG. 6 is a flow diagram illustrating a remove participants method 306 according to one embodiment. At 602 in method 306, the total participants count 312 is decremented based on the number of threads being removed (e.g., the count 312 is decremented by one if one thread is being removed, the count 312 is decremented by two if two threads are being removed, etc.). At 604, it is determined whether the total participants count 312 is less than the current participants count 310. If it is determined at 604 that the total participants count 312 is less than the current participants count 310, the method 306 moves to 606, where an exception is thrown (i.e., the blocked threads could block indefinitely if the total participants count 312 is decremented to be less than the current participants count 310).

If it is determined at 604 that the total participants count 312 is not less than the current participants count 310, the method 306 moves to 608, where it is determined whether the total participants count 312 (after decrementing at 602) is equal to the current participants count 310. If it is determined at 608 that the total participants count 312 is equal to the current participants count 310, the method 306 moves to 610, which indicates that the current phase is finished. In one embodiment, finishing of the current phase at 610 involves setting the current participants count 310 to zero, flipping the current sense flag 314, and setting and resetting the events 318 and 320 based on the current sense flag 314. If it is determined at 608 that the total participants count 312 is not equal to the current participants count 310, the method 306 moves to 612, which indicates that the current phase is continued.

Figure 7:
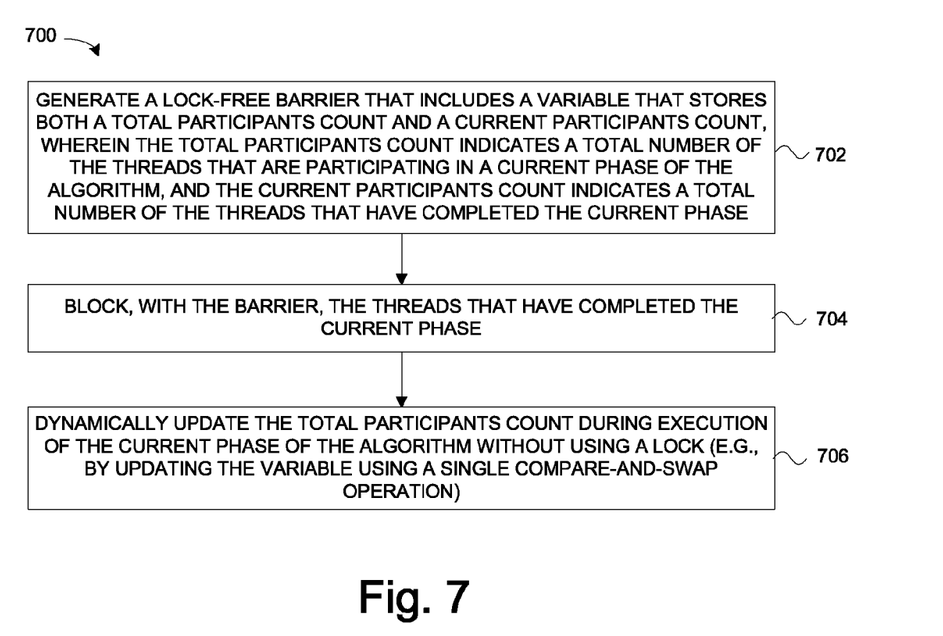
FIG. 7 is a flow diagram illustrating a method of executing an algorithm in a parallel manner using a plurality of concurrent threads according to one embodiment.

FIG. 7 is a flow diagram illustrating a method 700 of executing an algorithm in a parallel manner using a plurality of concurrent threads according to one embodiment. At 702, a lock-free barrier 300 is generated that includes a variable 308 that stores both a total participants count 312 and a current participants count 310, wherein the total participants count 312 indicates a total number of the threads that are participating in a current phase of the algorithm, and the current participants count 310 indicates a total number of the threads that have completed the current phase. At 704, the barrier blocks the threads that have completed the current phase. At 706, the total participants count 312 is dynamically updated during execution of the current phase of the algorithm without using a lock (e.g., by updating the variable 308 using a single compare-and-swap operation).

In one embodiment, the barrier 300 in method 700 is a sense-reversing barrier that tracks whether the current phase is odd or even, and the variable 308 in method 700 is a thirty-two bit integer variable that also stores a flag 314 for indicating whether the current phase is an odd phase or an even phase. The barrier 300 in method 700 according to one embodiment includes a signal and wait method 302 configured to be called by each thread that completes the current phase to indicate its completion to other threads, and configured to cause each thread that completes the current phase to wait for all threads to complete the current phase.

Figure 8:
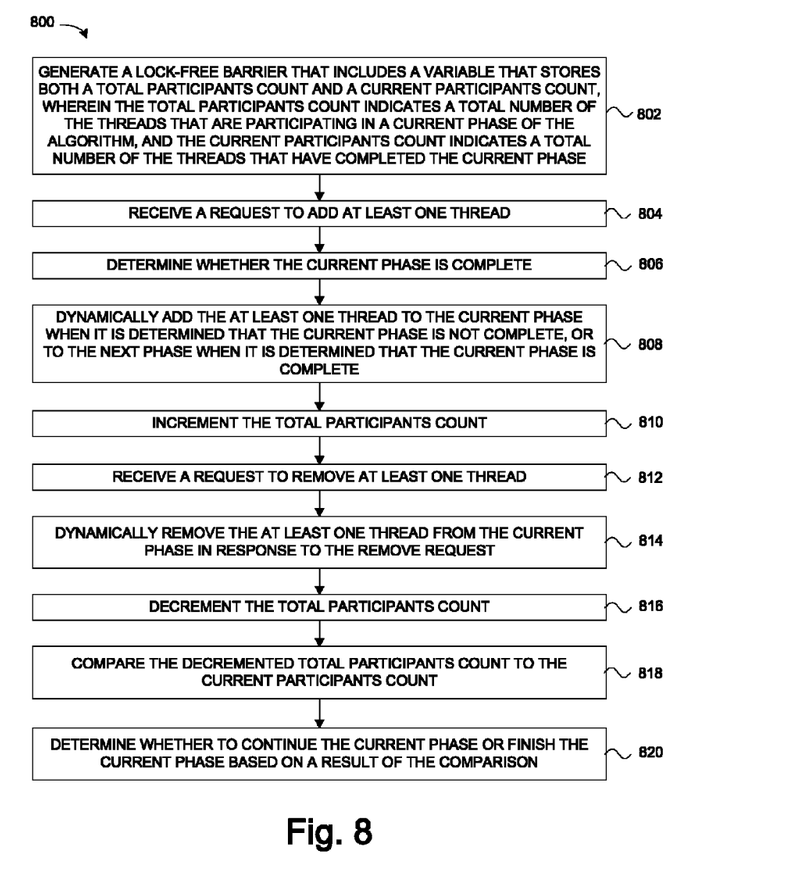
FIG. 8 is a flow diagram illustrating a method of executing an algorithm in a parallel manner using a plurality of concurrent threads according to another embodiment.

FIG. 8 is a flow diagram illustrating a method 800 of executing an algorithm in a parallel manner using a plurality of concurrent threads according to another embodiment. At 802, a lock-free barrier 300 is generated that includes a variable 308 that stores both a total participants count 312 and a current participants count 310, wherein the total participants count 312 indicates a total number of the threads that are participating in a current phase of the algorithm, and the current participants count 310 indicates a total number of the threads that have completed the current phase. At 804, a request to add at least one thread is received. At 806, it is determined whether the current phase is complete. At 808, the at least one thread is dynamically added to the current phase when it is determined at 806 that the current phase is not complete, or the at least one thread is dynamically added to the next phase when it is determined at 806 that the current phase is complete. At 810, the total participants count is incremented. At 812, a request to remove at least one thread is received. At 814, the at least one thread is dynamically removed from the current phase in response to the request. At 816, the total participants count 312 is decremented. At 818, the decremented total participants count 312 is compared to the current participants count 310. At 820, it is determined whether to continue the current phase or finish the current phase based on a result of the comparison at 818.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of executing an algorithm in a parallel manner using a plurality of concurrent threads, comprising:
generating a lock-free barrier that includes a variable that is configured to be updated using a lock-free technique and that stores a total participants count, a current participants count, and a flag, the total participants count indicating a total number of threads in the plurality of concurrent threads that are participating in a current phase of the algorithm, the current participants count indicating a total number of threads in the plurality of concurrent threads that have completed the current phase, and the flag indicating whether the current phase is an odd phase or an even phase, wherein the barrier is a sense-reversing barrier that tracks whether the current phase is odd or even, and wherein the total participants count, the current participants count, and the flag stored in the integer variable are configured to be updated using a single compare-and-swap (CAS) operation;
blocking, with the lock-free barrier, the threads that have completed the current phase;
dynamically updating the total participants count during execution of the current phase of the algorithm; and
wherein the generating, blocking, and dynamically updating are performed by at least one processor.

2. The method of claim 1, wherein the dynamically updating the total participants count comprises:
updating the variable using the lock-free technique.

3. The method of claim 1, wherein the variable is a thirty-two bit integer variable.

4. The method of claim 1, and further comprising:
receiving a request to add at least one thread to the threads that are participating in the current phase of the algorithm;
determining whether the current phase is complete;
adding the at least one thread to the current phase in response to a determination that the current phase is not complete; and
incrementing the total participants count in response to adding the at least one thread to the current phase.

5. The method of claim 4, and further comprising:
adding the at least one thread to a next phase in response to a determination that the current phase is complete.

6. The method of claim 1, and further comprising:
receiving a request to remove at least one thread;
removing the at least one thread from the current phase in response to the request; and
decrementing the total participants count.

7. The method of claim 6, and further comprising:
comparing the decremented total participants count to the current participants count; and
determining whether to continue the current phase or finish the current phase based on a result of the comparison.

8. The method of claim 1, wherein the barrier is configured to respond to a signal and wait call from each thread that completes the current phase to indicate its completion to other threads, and is configured to cause each thread that completes the current phase to wait for all threads to complete the current phase.

9. A computer-readable storage medium storing computer-executable instructions that when executed by at least one processor cause the at least one processor to perform a method of executing an algorithm in a parallel manner using a plurality of concurrent threads, the method comprising:
generating a lock-free barrier that includes a variable that is configured to be updated using a lock-free technique and that stores a total participants count, a current participants count, and a flag, the total participants count indicating a total number of threads in the plurality of concurrent threads that are participating in a current phase of the algorithm, the current participants count indicating a total number of threads in the plurality of concurrent threads that have completed the current phase, and the flag indicating whether the current phase is an odd phase or an even phase, wherein the barrier is a sense-reversing barrier that tracks whether the current phase is odd or even, and wherein the total participants count, the current participants count, and the flag stored in the integer variable are configured to be updated using a single compare-and-swap (CAS) operation;
blocking, with the lock-free barrier, the threads that have completed the current phase; and
dynamically updating the total participants count during execution of the current phase of the algorithm by updating the variable.

10. The computer-readable storage medium of claim 9, wherein dynamically updating the total participants count comprises:
updating the variable using a lock-free technique.

11. The computer-readable storage medium of claim 9, wherein the variable is a thirty-two bit integer variable.

12. The computer-readable storage medium of claim 9, wherein the method further comprises:
receiving a request to add at least one thread;
determining whether the current phase is complete;
adding the at least one thread to the current phase in response to a determination that the current phase is not complete; and
incrementing the total participants count in response to adding the at least one thread to the current phase.

13. The computer-readable storage medium of claim 12, wherein the method further comprises:
adding the at least one thread to a next phase in response to a determination that the current phase is complete.

14. The computer-readable storage medium of claim 9, wherein the method further comprises:
receiving a request to remove at least one thread;
removing the at least one thread from the current phase in response to the request; and
decrementing the total participants count.

15. The computer-readable storage medium of claim 14, wherein the method further comprises:
comparing the decremented total participants count to the current participants count; and
determining whether to continue the current phase or finish the current phase based on a result of the comparison.

16. A method of executing an algorithm in a parallel manner using a plurality of concurrent threads, comprising:
generating a lock-free barrier that includes an integer variable that stores a total participants count, a current participants count, and a flag, wherein the total participants count indicates a total number of threads in the plurality of concurrent threads that are participating in a current phase of the algorithm, the current participants count indicates a total number of threads in the plurality of concurrent threads that have completed the current phase, and the flag indicates whether the current phase is an odd phase or an even phase, and wherein the total participants count, the current participants count, and the flag stored in the integer variable are configured to be updated using a single compare-and-swap (CAS) operation, and wherein the barrier is a sense-reversing barrier that tracks whether the current phase is odd or even;
blocking, with the lock-free barrier, the threads that have completed the current phase;
dynamically updating the total participants count during execution of the current phase of the algorithm by updating the integer variable using a lock-free technique; and
wherein the generating, blocking, and dynamically updating are performed by at least one processor.

17. The method of claim 16, and further comprising:
receiving a request to add at least one thread;
determining whether the current phase is complete;
adding the at least one thread to the current phase in response to a determination that the current phase is not complete;
adding the at least one thread to a next phase in response to a determination that the current phase is complete; and
incrementing the total participants count in response to adding the at least one thread to the current phase.

* * * * *